United States Patent [19]

Caris et al.

[11] 4,039,168
[45] Aug. 2, 1977

[54] SCREW EXTRUDER FOR THE PRODUCTION OF AN EXPANDED DRY FEED FOR FOODSTUFF

[75] Inventors: Josephus Antonius Marie Caris, Putten; Johannes Antonius de Goede, Arnhem, both of Netherlands

[73] Assignees: Trouw & Co. N.V., Putten; Machinefabriek Lalesse B.V., Arnheim, both of Netherlands

[21] Appl. No.: 538,418

[22] Filed: Jan. 3, 1975

[30] Foreign Application Priority Data
Jan. 8, 1974 Netherlands .......................... 7400221

[51] Int. Cl.² ............................................. B01F 7/08
[52] U.S. Cl. .......................................... 259/9; 259/191
[58] Field of Search ............. 259/191, 192, 193, 910, 259/DIG. 18; 425/204, 208, 209; 165/87, 92

[56] References Cited
U.S. PATENT DOCUMENTS

| 2,838,794 | 6/1958 | Munger et al. ............. 259/191 |
| 3,827,841 | 8/1974 | Kawai et al. ................... 259/9 |
| 3,850,415 | 11/1974 | Hansen ........................ 259/191 |

*Primary Examiner*—Robert W. Jenkins

[57] ABSTRACT

Proteinaceous raw materials, possibly mixed with starchy raw materials are extruded into an expanded dry feed or foodstuff by extruding a starting mix with at least 12 but not more than 20 percent by weight of moisture in a short time, while keeping the extruder permanently filled with raw material mixture. Preferably not more than 7 percent of fat should be present. The inventive apparatus for extruding this material has grooves in the extrusion casing extending in longitudinal direction, and the extrusion screw ends at the outlet side in a nose cone. Preferably one pitch length is present between a screw seal and the feed inlet, and also one pitch length is present between the feed inlet and a compression section of the screw.

2 Claims, 5 Drawing Figures

SCREW EXTRUDER FOR THE PRODUCTION OF AN EXPANDED DRY FEED FOR FOODSTUFF

BACKGROUND OF THE INVENTION

The invention relates to an apparatus for the production of an expanded dry feed or foodstuff from proteinaceous and possibly starchy raw materials or screw extruder, in which raw materials are mixed with water and extruded at elevated temperatures and pressures into a material which on issuing from the extruder spontaneously expands under loss of moisture.

In a known process the raw materials are mixed with water until a moisture content of 25 – 35 percent by weight is reached, and then subjected to the action of an extruder-cooker in which the mixed materials are converted into a fluid mass under the influence of heat and high pressure. The temperature of this mass lies above 100° C. When this mass is pressed through the extruder orifice into an environment with atmospheric pressure, the water heated to above its boiling point will escape more or less explosion-like as steam, because of which the mass will expand into a cellular material. This material is subsequently cut into bits and further dried until it reaches a stable moisture content of about 10 percent by weight. The disadvantage of this process is that the product issuing from the extruder is still too wet and should be dried before it is ready for shipment. This drying step increases the cost of the product and causes important losses because of dust formation, disintegration and the like.

Thus it was suggested in the prior art to obviate this drying step by abstaining from adding additional moisture to the starting products with a balanced moisture content, but adding instead an organic edible solvent, which has in general a low volatility, like glycerol and propylene glycol.

Such a process, however, provides a product in which a large part of the added organic liquid remains. Because of this the texture of the obtained product will be permanently affected, which is hardly desirable for some applications.

Thus the desire remains to provide a process in which the extruded product needs no additional drying step, too, but in which no foreign materials should remain in the product.

SUMMARY OF THE INVENTION

It was found by the inventors that it is possible in a special embodiment of an extruder to extrude a starting material with less than 20 percent by weight of moisture, in which the extrusion product can be used immediately without further drying while no foreign material remains in the mixture.

Correspondingly the invention provides an apparatus for the production of an expanded dry feed or foodstuff from proteinaceous and possible starchy raw materials, or screw extruder in which raw materials are mixed with water and extruded at elevated temperatures and pressures into a material which on issuing from the extruder spontaneously expands under loss of moisture, wherein a starting mixture with at least 12 but not more than 20 percent by weight of moisture is extruded without preceding cooking step in a short time period while care is being taken that all of the free space in the extrusion casing is permanently filled with the fed-in raw material mixture.

The short residence time in the extruder is obtained by promotion of the forward flow of the material through the extruder casing. To this end there are longitudinal grooves in the extrusion casing, and the extrusion screw ends in a nose cone at the extrusion opening. Also the conveyor zone after the location of the feed inlet and before the compression zone in the extrusion casing is preferably at least one pitch-length of the extrusion screw long. Moreover, a complete pitch length should be present between the seal at the back end of the screw and the feed inlet. It also has its advantages when in the conveyor zone the extrusion screw is inwardly and locally cooled. Under certain conditions a possible local cooling of the outer jacket may be desirable, too. It is also important that the number of revolutions of the extrusion screw is not increased too much. Preferably this number of revolutions is kept below 120.

The moisture content of the starting material should be neither too high, nor too low. Best results are obtained with a moisture content of the starting material of 15 – 18 percent by weight.

For a proper functioning of the extrusion apparatus according to the invention it is necessary that the material in the extruder is subjected to enough friction to warm itself during extrusion. To this end it is necessary that the starting materials mixture does not comprise too large an amount of fat, because fat has lubricating properties and therefore decreases friction. Accordingly the starting mixture used does preferably not comprise more than 7 percent of fat. If it is desired to produce products with a higher fat content, this can best be done according to the invention by subsequent addition of fat to the product, for instance by spraying the product with a fat. During this spraying with fat, for instance vitamins and flavourings may be added, too.

In order to obtain a product showing coherence and expansion it is necessary that while using proteins which are not plastifyable under the present circumstances a minimum amount of starch is present. Satisfactory results will be obtained in practice with starch contents of between 20 and 80 percent.

In the disclosed exemplary apparatus for the execution of the above-described method, the extrusion casing is provided with grooves extending in longitudinal direction and the extrusion screw at the extrusion outlet side ends in a cone. Preferably the feed inlet is provided at at least one pitch-length before the start of the compression zone in the extrusion casing.

In another preferred embodiment inner channels are provided in the conveyor zone of the extrusion screw for passing a coolant.

In a further preferred embodiment of the invention the grooves in the extrusion casing have in cross-section the shape of a rectangular trapezium, the radially extending rectangular side of which is past in the bevelled edge, seen in the direction of rotation of the screw.

Relative to existing processes in which no additional plasticizers are added, the invention has many other important advantages. Thus, the dry solids capacity can be higher owing to the low moisture content. The starch granules present in the material are disintegrated more completely. The heating period is shorter, thus making the decomposition hazard smaller. The invention makes only few demands on the used raw materials. There is no necessity for a forced feed to the screw, because the low moisture content takes care that the mixture will be still free-flowing. Further a better expansion of the end product is reached, resulting in a lower weight per liter of this end product. The advantage thereof is that, if desired, more fat may be added subsequently, which is for instance important for fish feed, since this may be used, amongst others, to enlarge the floating time period of the feed.

Finally there are less losses in upstarting or stopping the process, because the starting mixture is not strongly polluting to the equipment owing to its relatively dry consistency.

It has been mentioned hereinabove that the fat content of the mixture should not be too high. The maximum is 6–7 percent. Further, when applying proteins which are not plastifiable under the present circumstances, a certain minimum amount of starch should be present, because otherwise no sufficient cohesion and/or expansion is obtained.

Most proteinaceous raw materials cannot be plastified without using starch and are comprised like inert filler material in the more or less continuous starch gel phase. With 15 percent of maize as a sole starch source besides proteinaceous starting materials like beef greaves, meat and bone meal, etc. there is hardly any expansion. With 20 percent of maize a reasonable expansion arises.

It should be noted that the invention may be executed very well with a filling to which no starch is added to the proteinaceous raw materials.

For a proper functioning it is necessary that the extruder is completely filled with the raw materials that are to be treated. The steam baffle rings often used in other extruders are therefore not necessary. That is: in the compression zone the moisture present in the starting material is converted into steam. This steam can, of course, only move backwards, because there is where the lowest pressure is. If steam would escape towards the rear, too little moisture would remain to make the material plastic, which would cause jamming of the machine. Further the steam may condense on the jacket and/or screw of the extruder if no starting mixture would be fed, because of which moisture will deposit on parts of the press, causing incrustation of material. Because of the incrustation the material transport is deteriorated. If the extruder is kept filled in the rear, too, the freshly fed material will intercept this steam.

It is observed that there is, of course, always some transport of steam in backward direction, causing the moisture content of the fresh starting mixture first to increase and subsequently to decrease again on passage through the channel between screw and jacket. At the upstart of an operation, that is when the channel between the screw and the jacket is still completely void, there is, of course, no formation of steam and the moisture content will therefore not rise. However, it does decrease on passage of the first material through the channel between screw and jacket and therefore an operation should always be upstarted with a starting material the moisture content of which is slightly higher than normal. In a way this additional amount of moisture will remain circulating in the apparatus.

The above considerations mean that there should take place a continuous and uniform transport of starting material, because otherwise centres with an unacceptable low moisture content will arise in the compression zone and with an unacceptable high moisture content in the conveyor and feeding zone. The grooves slotted into the extrusion jacket promote a uniform transport (and therefore a constant residence time). Because of the action of the grooves in the jacket the material cannot turn around with the screw, but is transported rectilinearly in forward direction. Because of continuous shearing at these grooves and owing to the compression in the compression zone, heat is generated which may be sufficient after a proper selection of chamber depth, number of revolutions of the screw and the like, to plastify the material and to cause it to expand on issue.

It is also observed that it is, of course, necessary to bring the apparatus (screw and jacket) first to the right temperature before the extrusion is started.

After the material has passed the compression zone and is kept on temperature in the compressed conveyor part, an additional compression takes place over the nose cone, which is largely converted into speed. The compression ratio, measured over the cylindrical part of the screw, is in one embodiment about 1 to 2, but the compression, measured over the cone length, is many times larger. The total compression is obtained by multiplication of the two compression ratios.

The selection of the pitch angle of the screw in the extruder is dependent on the length of the united conveyor and compression zone and is, together with the speed of rotation of the screw, decisive for the residence time period. In order to properly obviate steam backfiring it is especially important that the conveyor part is of sufficient length. For optimal transport and an optimal filling degree it is desirable that both before and after the feed inlet a complete pitch length is present, respectively in the conveyor part before the beginning of the compression zone, and between feed inlet and sealing.

The screw and/or jacket of the extruder may be cooled over this complete length or over part of it in order to maintain the correct temperature at the desired location. Usually the screw is cooled internally, which leads to a lesser lengthening of the residence time of the material in the extruder.

The number of revolutions is, of course, linked up with the pitch of the screw and the desired residence time. However, the filling of the extrusion chamber requires time and thus a relatively low number of revolutions is chosen. Above a number of revolutions of 120 per minute the filling degree does not appear to be optimal. However, this only holds true for free-flowing starting material. If a forced feed is in operation the number of revolutions may be selected at a higher value.

DESCRIPTION OF THE DRAWINGS

The invention is now further elucidated with reference to the accompanying drawings of a non-limitative exemplary embodiment of the inventive apparatus, wherein.

In FIG. 1 is depicted a rotatable screw and a jacket of an extruder according to the invention. The screw is indicated by reference number 1, the jacket or casing by reference number 2. The jacket is subsequently composed of a feed hopper or filler opening 3, a jacket cooler 4 and coupling flanges 5, 6 and 7. The jacket is closed by a nozzle 8. On the screw 1 are distinguished a pushing section *a*, a conveyor section *b*, a compression section *c*, and a pressure conveyor section *d*. The pushing section a can also be called a rear or push zone; the conveyor section b is a filling and transport zone; and finally the pressure conveyor section a can be termed a final or constant-pressure zone. In a preferred embodiment of the invention the collective sections b, c and d may be kept short and may have a collective length of ten times the diameter of the screw. The last-mentioned section d passes into a nose cone 9. Inside the screw a cooling means 10 may be provided, in the form of channels, in which the current direction of the cooling liquid is indicated by arrows 11 and 12.

Figure 2:
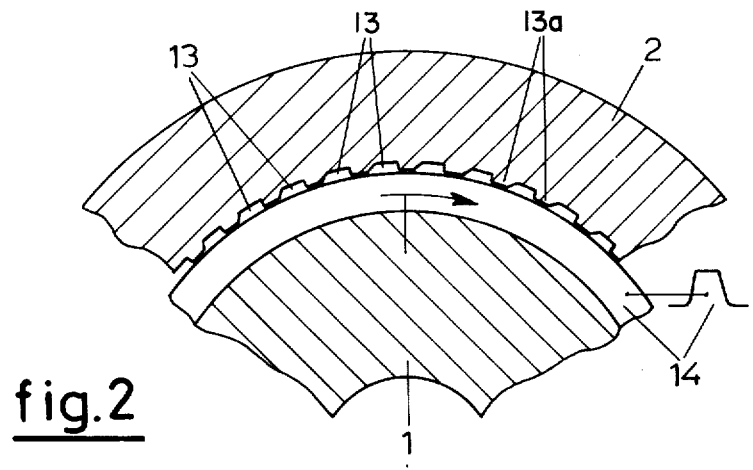
FIG. 2 is a partial section on a larger scale according to the plane II—II of FIG. 1.

In the jacket 2, internal grooves 13 are slotted in longitudinal direction, as indicated in FIG. 2. The groove 13 are spaced apart at 13a, as can be seen in FIG. 2. An arrow shows the direction of rotation of the screw. At 14, convolutions of the screw 1 are shown in all figures.

Figure 1:
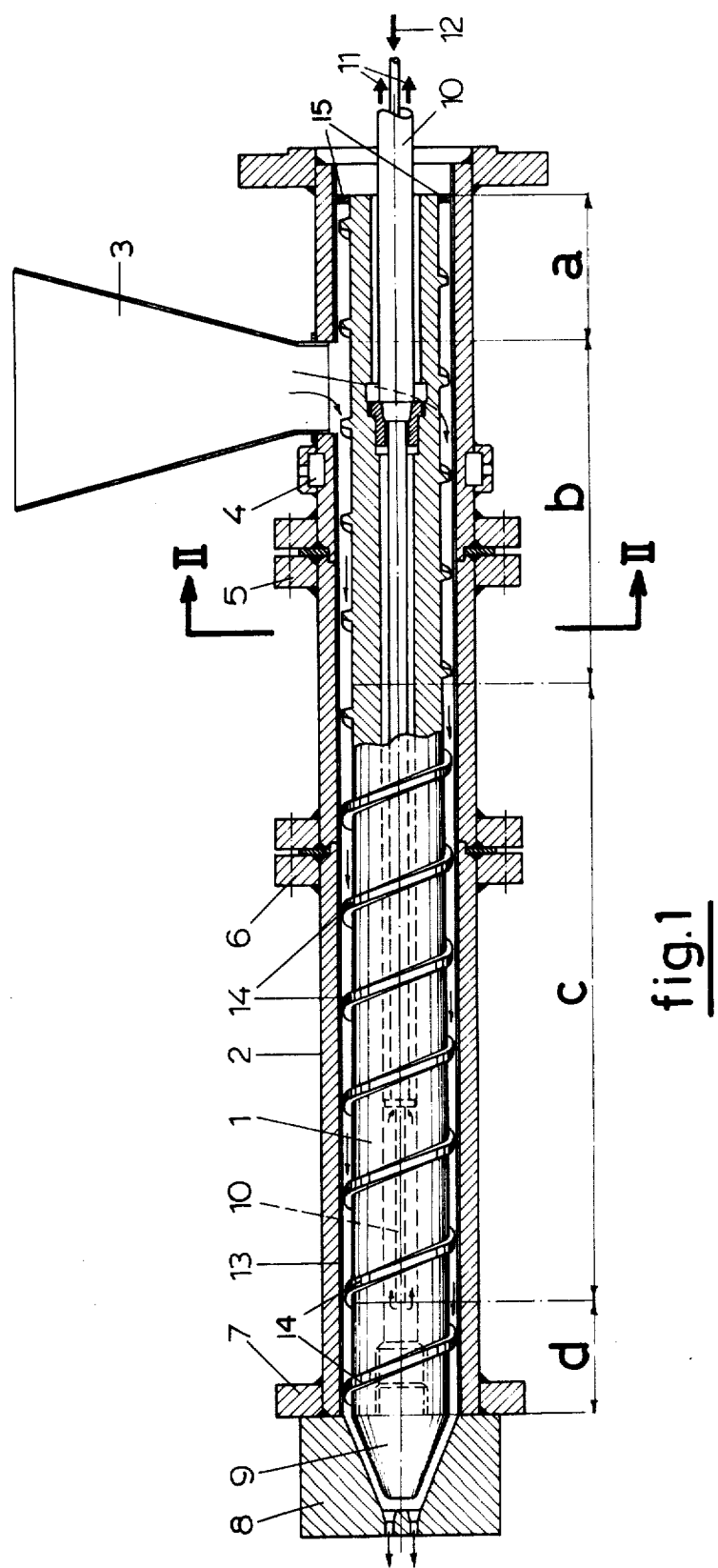
FIG. 1 is a longitudinal section of an extruder according to the invention.

In FIG. 1, a conventional seal 15 can be seen, interposed about the inlet of the screw 1 and the internal grooves 13 of the jacket or casing 2.

Figure 3A:
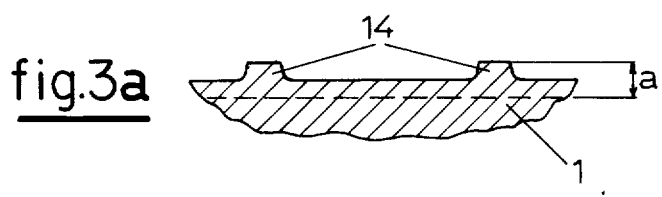
FIGS. 3a, 3b, and 3c show parts of longitudinal sections of the screw of FIG. 1.
Figure 3B:
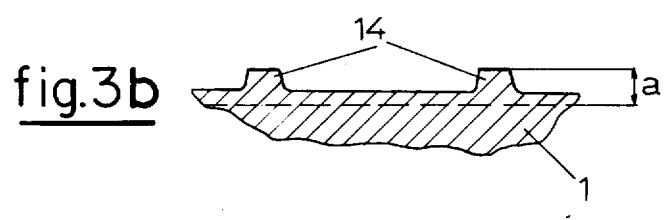
Figure 3C:
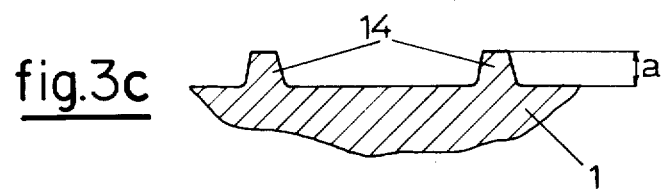

In the FIGS. 3a, 3b and 3c respectively, sections are given through a part of the screw lying in the sections d, c and b of FIG. 1. It appears that in section d the chamber depth in the screw is smallest. Thus the largest pression prevails in section d. Moreover the chamber depth in section d is constant, just as in sections b and a, where, however, the chamber depth in the screw is greatest. In these conveyor parts thus the smallest pressure prevails. The compression part c thereinbetween is a section with a changing, that is continually decreasing, chamber depth, so that in this part the pressure continually increases towards the maximum value, which is maintained in section d. In nozzle 8 the pressure increases quickly over a short distance, causing a fast expansion when issuing from the nozzle accompanied by a fast loss of water vapour.

According to the present invention, a screw extruder is thus provided for the production of an expanded dry feed or foodstuff, comprising the stationary jacket or casing 2 which has the inner wall that defines the axially extending bore; the screw mounted for rotation with the casing; the latter and the screw defining the push zone a, the filling and transport zone b, the compression zone c and the final zone d; the casing 2 has the lateral filler opening or hopper 3 at the beginning of the transport zone, and further has the outlet at one end thereof; the screw 1 includes the end portion 9 near the outlet, that end portion having the shape of a cone, the bore in the casing having the end portion 8 that surrounds the end portion of the screw and also having the shape of a cone, the casing 2 and the screw 1 extending in the push zone beyond the filler opening 3 over a distance that is equal to at least one pitch length of the screw in the direction opposite to the outlet; the screw being sealed at 15 with respect to the casing 1 at the end of the push zone; the filler opening 3 being positioned at a distance of the compression zone which is at least equal to one pitch length of the screw; the casing 2 having the spaced apart internal grooves 13 in the longitudinal direction, these grooves having in cross-section the shape of a rectangular trapezium including a radially extending rectangular edge and a bevelled edge, the rectangular edge being the front edge and the bevelled edge being the rear edge when seen in the direction of rotation of the screw 1. Preferably the latter has the inner channels 10 therein for the passage of the coolant as shown by the arrows 11 and 12. The further apparatus and means pertaining to the extruder according to the invention are completely conventional and do not need a further description within the scope of the present invention.

PREFERRED EMBODIMENTS

The invention is further elucidated by a number of non-limiting examples given hereinbelow. The parts are parts by weight.

EXAMPLE 1

For the preparation of a dog feed a raw material is compounded from 7.5 parts of meat and bone meal, 5 parts of defatted fish meal, 5 parts of blood flour, 3 parts of yeast, 17 parts of defatted soy, 2.5 parts of pulp, 2 parts of sugar, 2 parts of a mixture of vitamins, minerals and flavourings and 56 parts of maize. The moisture content of such a mixture is for instance 10.5 percent. This is too low for direct extrusion, so that it is brought up to 17 percent by the addition of water. This water addition may be effected continuously in special equipment in the ready mixture, but addition of all the water may also be effected to the ground maize, after which the moist maize is mixed with the other ingredients. With this moisture content of 17 percent the mixture is still free-flowable and may flow without forced feed into the extruder.

The extruder which is used is of the type described hereinabove with reference to FIGS. 1–3 with a pitch angle of 15° and a number of revolutions of 80 r.p.m. The maximum temperature in the extruder (jacket temperature) amounts to 125° C. This temperature is maintained by adjustment of the screw and jacket cooling. With the screw rotating at a speed of 80 r.p.m. the residence time in the extruder is about 60 seconds, while at 120 r.p.m. the residence time amounts to about 40 seconds. This time is calculated from the moment the material is taken up by the screw at the inlet until the moment the same material issues from the extruder opening.

To the expanded product issuing from the nozzle an additional 6 percent of fat is added in an apparatus suited for this purpose.

The product obtained is excellently expanded, sufficiently dry to be used without further drying, and has an excellent taste and texture.

It is observed that the water need not be added as a liquid. For instance, it is also possible to add in calculated amounts material with a high moisture content like fresh meat, liver, meat offal, fish, fish offal, blood and the like and thereby to obtain the desired moisture content.

EXAMPLE 2

For a cat feed a starting mixture is compounded from 8 parts of defatted fish flour, 8 parts of meat and bone meal, 7.5 parts of blood meal, 5 parts of casein, 2.5 parts of yeast, 20 parts of defatted soy, 2.5 parts of pulp, 2 parts of a mixture of vitamins, minerals and flavourings and 40 parts of maize. For the adjustment of the moisture content a diluted phosphoric acid solution is added to the amount of maize flour. In this manner an expanded product is obtained (in the same way as in Example 1), a 10 percent aqueous suspension of which has a pH of about 5.5 After the expansion 4.5 percent of fat is still added.

Just as in Example 1 an instant dry packed feed of excellent quality and with a good texture is obtained, which is eaten greedily by cats.

EXAMPLE 3

For the preparation of a fish feed a starting mixture is compounded of 39 parts of defatted fish flour, 2.5 parts of yeast, 10 parts of defatted soy, 2 parts of a mixture of vitamins and minerals and 31.5 parts of maize. This mixture, too, is brought up to a moisture content of 17 percent in the manner indicated in example 1, and extruded as indicated in example 1. After expansion 15 percent of fat is added using a dusting drum.

The feed prepared in this manner is very stable and floats upon water. Even after 48 hours the granules are still intact.

If sinking fish feed is desired, this may be obtained by substituting part of the defatted fish flour by ordinary fat containing fish flour and/or by using a fullfat soy quality. Further the expansion may be strongly checked by the addition of 1-2 percent of glycerol, which leads to a higher weight per liter without damage to the cohesion of the product. In this case, the extrusion temperature may be chosen at a lower value than indicated in Example 1, for instance 100° C.

EXAMPLE 4

The apparatus according to the invention is exceedingly suitable for the production of urea containing ruminant feed, in which the urea is set free slowly under the circumstances prevailing in the rumen. This type of feed receives an increasing attention.

Preferably the production starts from a cheap starch source as a granulate, like tapioca chips, sweet potatoes and the like. To this at least 20 percent of urea is added, together with the necessary moisture. On extrusion in the extruder a more or less elastic product arises, which solidifies on keeping and in which the urea is very well enclosed. Preferably starting materials with a high starch content and a low protein content are used here in view of the influence of urea on proteins and starch.

EXAMPLE 5

Urea possesses the property to more or less gelatinize proteins and moisture comprising mixtures. This property may be used to advantage in the production of artificial worms for sports fishing.

Coarsely ground maize is brought to a moisture content of about 20 percent (possibly with addition of a colorant and a flavouring), after which about 10 percent of urea is added. The mixture obtained in this manner is fed directly to the extruder. In this case the temperature of the extruder is preferably not above about 90° C. From the openings in the nozzle a flexible rope flows, having a high tensile strength. To be true, this rope has a high moisture content, but because of the presence of urea the $a_w$-value is very low anyhow, so that in this condition it has very good keeping qualities. In order to maintain the flexibility of the rope, however, it is in this case necessary to provide a solid moisture-tight packing.

EXAMPLE 6

Textured protein may be produced according to the invention by coarsely grinding untoasted extracted soy flakes and bringing them to a moisture content of about 18 percent. The starting mixture thus obtained is directly fed to the extruder of Example 1, and possibly some sodium hydroxide solution is added. The partially expanded end product has the familiar lamellated appearance of textures soy products.

The inventive apparatus is also capable to texture casein and other proteinaceous starting materials, which may be plasticized under the present conditions. Preferably use is made of granulated neutralized acid casein, which is brought to a moisture content of 17 percent. It even appears that for instance casein expands to a much lower weight per liter than starch does. A mixture of casein and maize grits is excellently suited to production in the apparatus according to the invention of proteinaceous snacks.

EXAMPLE 7

Of course, it is also possible to expand single cereals on the apparatus according to the invention.

Yeast, salt, sugar and G.M.S. are added to coarsely ground wheat and the mixture is fed into the extruder without additional increase of moisture content. After cooling the expanded product may be ground immediately and may then be used as bread crumbs.

EXAMPLE 8

For the production of a special fish feed the property of for instance casein, to provide a very voluminous product after expansion, may be used to much advantage. Such a special fish feed may be used very well as feed for many different kinds of aquarium fish. Mostly these fish are overfed and therefore the feed should be very light and voluminous.

A mixture of 73 parts of casein, 25 parts of maize and 2 parts of a mixture of vitamins, minerals and colorants is directly fed to the extruder. The very bulky expanded product is coated with 10 percent of fat and then ground. The feed produced in this manner is very suitable as feed for many different kinds of aquarium fish, It keeps floating on the water and will not dissolve in it.

What we claim is:

1. A screw extruder for the production of an expanded dry feed or foodstuff, comprising: a stationary casing having an inner wall defining an axially extending bore; a screw mounted for rotation within said casing; the latter and said screw defining a push zone, a filling and transport zone, a compression zone and a final zone; said casing have a lateral filler opening at the beginning of said transport zone, and further having an outlet at one end thereof; said screw includes an end portion near said outlet, said end portion having the shape of a cone, said bore in the casing having an end portion surrounding said end portion of the screw and also having the shape of a cone, said casing and said screw extending in said push zone beyond said filler opening over a distance equal to at least one pitch length of said screw in a direction opposite to said outlet; said screw being sealed with respect to said casing at the end of said push zone; said filler opening being positioned at a distance of said compression zone which is at least equal to one pitch length of said screw; said casing having spaced-apart internal grooves extending in the longitudinal direction, said grooves having in cross-section the shape of a rectangular trapezium including a radially extending rectangular edge and a bevelled edge, said rectangular edge being the front edge and said bevelled edge being the rear edge when seen in the direction of rotation of said screw.

2. The screw extruder as defined in claim 1, wherein said screw has inner channels for the passage of a coolant.

* * * * *